United States Patent [19]

Lester et al.

[11] 4,110,794
[45] Aug. 29, 1978

[54] ELECTRONIC TYPEWRITER USING A SOLID STATE DISPLAY TO PRINT

[75] Inventors: Robert W. Lester, Manhasset; Robert Hotto, New York, both of N.Y.

[73] Assignee: Static Systems Corporation, New York, N.Y.

[21] Appl. No.: 765,339

[22] Filed: Feb. 3, 1977

[51] Int. Cl.$^2$ ................... B41B 19/00; H04N 1/00
[52] U.S. Cl. ..................... 358/256; 178/15; 178/30; 340/337; 350/330; 354/5; 355/40
[58] Field of Search .............. 340/337; 178/15, 30; 358/244, 256; 354/5; 350/160 LC

[56] References Cited

U.S. PATENT DOCUMENTS

| | | | |
|---|---|---|---|
| 3,824,604 | 7/1974 | Stein | 354/5 |
| 3,887,903 | 6/1975 | Martell | 340/324 AD |

*Primary Examiner*—Howard W. Britton
*Attorney, Agent, or Firm*—Allison C. Collard

[57] ABSTRACT

A word processing system for displaying and reproducing a plurality of alphanumeric characters on a solid state display and capable of printing from that display consisting of a housing containing an electronic keyboard with indicia markings on the keys. There is provided at least one solid state display device disposed adjacent to the housing and having a multitude of segments for reproducing the indicia identified on the keyboard. A logic means is connected to the keyboard and the solid state display, and scans the keyboard upon the depression of one or more keys to find out the identity of the keys depressed. A solid state memory is also connected to the logic means and contains coded information concerning the keyboard indicia so that a character can be generated and reproduced on the solid state display responsive to the keyed indicia. There is also provided a data storage means for sequentially recording each of the keyed indicia responses provided by the keyboard and a means for printing the indicia displayed on the solid state screen. A plurality of pages of information can be stored in the system and sequentially reproduced by the printer from the electronic display.

18 Claims, 14 Drawing Figures

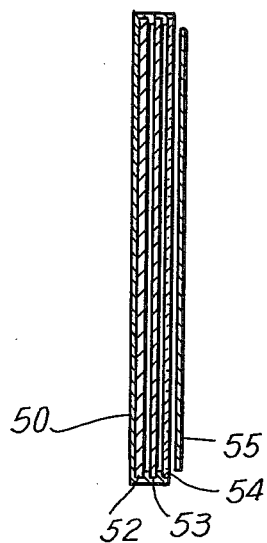
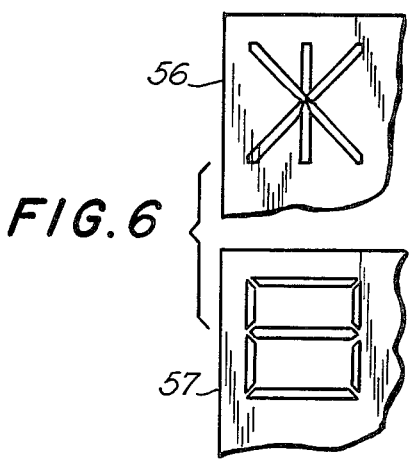
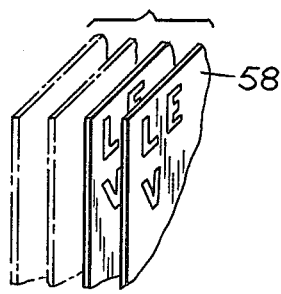
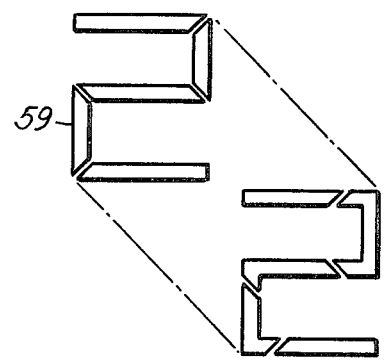
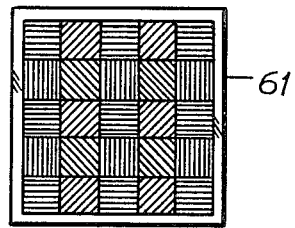
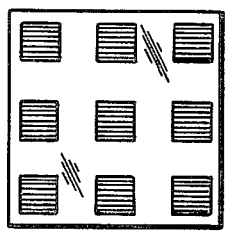
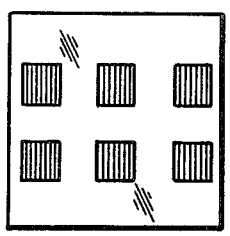
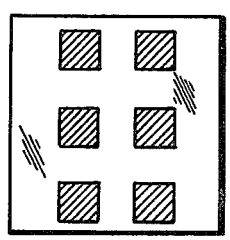
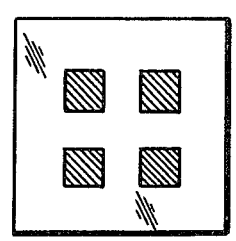

ELECTRONIC TYPEWRITER USING A SOLID STATE DISPLAY TO PRINT

This invention relates to a liquid crystal word processing apparatus.

More specifically, this invention relates to a liquid crystal word processing apparatus having a keyboard and a display means consisting of one or more liquid crystal panels for reproducing the indicia created by the keyboard and permitting the indicia to be reproduced onto paper after a typewritten page has been completed.

Word processing machines, that is typewriters having stored memories first became available to the public during the middle 1960's. IBM Corporation developed the MTST model having a single or dual tape drive which was capable of receiving programmed information from a typewriter and allowing corrections to be made to the program before the final copy was typed. A number of other manufacturers such as Remington, Redactron, Sabin as well as IBM also began producing magnetic card typewriters having single and dual card capability. The typed information was stored on one or more magnetic cards and could be recalled by inserting the card into a card reader at any time. Suitable corrections could be made to the text of the card so that the machines removed the necessity of expensive proof reading of the final material once minor corrections were made to the original copy. More sophisticated word processing machines have also been developed using a full page CRT (cathode ray tube) display such as the Vydec apparatus. This allows a full video display of the typed information before it is transcribed on paper.

There is also a Xerox 1200 Model which consists of a binary information fed or serially fed photocopying machine which, however, employs many moving parts, including a character-generating drum moving at high speed inside the seleninum reproduction drum. The character drum works in combination with a photo-optical generator for reproducing the images on the reverse side of the seleninum drum, so that they can be printed after suitable dusting and heat. The images produced by this Xerox method are blurred and this differs from the present invention, which does not have any moving parts or any noise since it is entirely electronic in its character generation.

Almost all of the above machines require the use of a mechanical printing device for transcribing the recorded information on to a printed page. Some of the word processing devices use a heavy duty IBM selectric typewriter, whereas others use a high speed printer capable of printing approximately 500 words per minute. Newer printers are becoming available using an ink spray deposit method in an attempt to improve the speed of the printout. Where a large number of pages have to be reproduced from stored information, the operator of the word processing machine remains idle for long periods of time until the mechanical printing device can complete the transfer of the information from a memory disc or tape to the printed page.

The conventional word processing machines also suffer from the disadvantage that the mechanical printers are subject to breakdown and require frequent repairs or adjustments during a heavy duty operation. The mechanical printing portion of the word processing machines also represents a substantial cost of the word processor, so that the price to purchase some of the conventional word processors run between $10,000 - $18,000. Moreover, the cost of typewriter ribbons for the mechanical processors runs about $200 to $500 per year, an expense that is eliminated by the present invention.

Accordingly, the present invention provides an improved word processing apparatus which uses electronic circuitry and a solid state display for transferring the stored information to the printed page. A conventional photocopy device can be coupled to the solid state display, such as a liquid crystal display to quickly reproduce the information that is written on the display after the information is taken from the stored memory.

However, the conventional photocopy device such as a Xerox machine using untreated paper has a disadvantage in that there are many mechanical moving parts within the machine. It is possible to eliminate the above disadvantage by using a photosensitive paper that develops upon the application of heat, such as Thermofax paper used by the 3M manual copier. Thus, the inventive word processing system can be made completely solid state without any moving parts when reproducing typewritten copy.

One of the problems of liquid crystal displays is the segmentation between adjacent areas thus causing written indicia to be broken into a plurality of individual lines to form a number or letter. This is clearly illustrated on a liquid crystal watch display presently available. In order to overcome this disadvantage, the present invention provides a plurality of superimposed liquid crystal display panels in which the information is simultaneously written. The adjacent LC panels are slightly offset to cover over the segmentation or the upper most LC panel so that all signs of interruptions or segmentated lines will disappear and the letters will be perfectly formed. Since the LC display is an electronic device, the stored information can be almost instantly reproduced from the stored memory. Moreover, both the size of the indicia and the style of the type can also be changed since the apparatus is not dependent upon mechanical printing means for reproducing the letters. Once a completed letter has been written on the LC display, it can be quickly reproduced one or a number of times by a conventional photocopy machine such as a Xerox apparatus. Thus, the original letter can be copied and simultaneously reproduced for as many copies as needed.

It is therefore an object according to the present invention to provide a liquid crystal word processing apparatus which is capable of reproducing stored information at a rate faster than conventional devices.

It is another object according to the present invention to provide a liquid crystal word processing apparatus which is simple in design, easy to manufacture and reliable in operation. Other objects and features of the present invention will become apparent from the following detailed description considered in connection with accompanying drawings which disclose the embodiments of the invention. It is to be understood, however, that the drawings are designed for the purpose of illustration only and not as a definition of the limits of the invention.

In the drawings wherein similar reference characters denote similar elements throughout the several views:

FIG. 5 is a cross sectional view showing several overlapping LC panels;

FIG. 6 is a detailed view showing the LC segments to make up letters or numbers from two different panels;

FIG. 7 is a detailed view showing adjacent overlapping LC panels with reproduced indicia; FIG. 8 illustrates a particular indicia taken from two different LC panels;

FIG. 9 illustrates one typical line of indicia of an LC panel;

FIG. 10 is a detail view showing a composite of a plurality LC overlapping panels with all segmentation removed;

FIGS. 11-14 illustrate different LC panels before they are overlapped showing different arrangements for removing segmentation.

Figure 1:
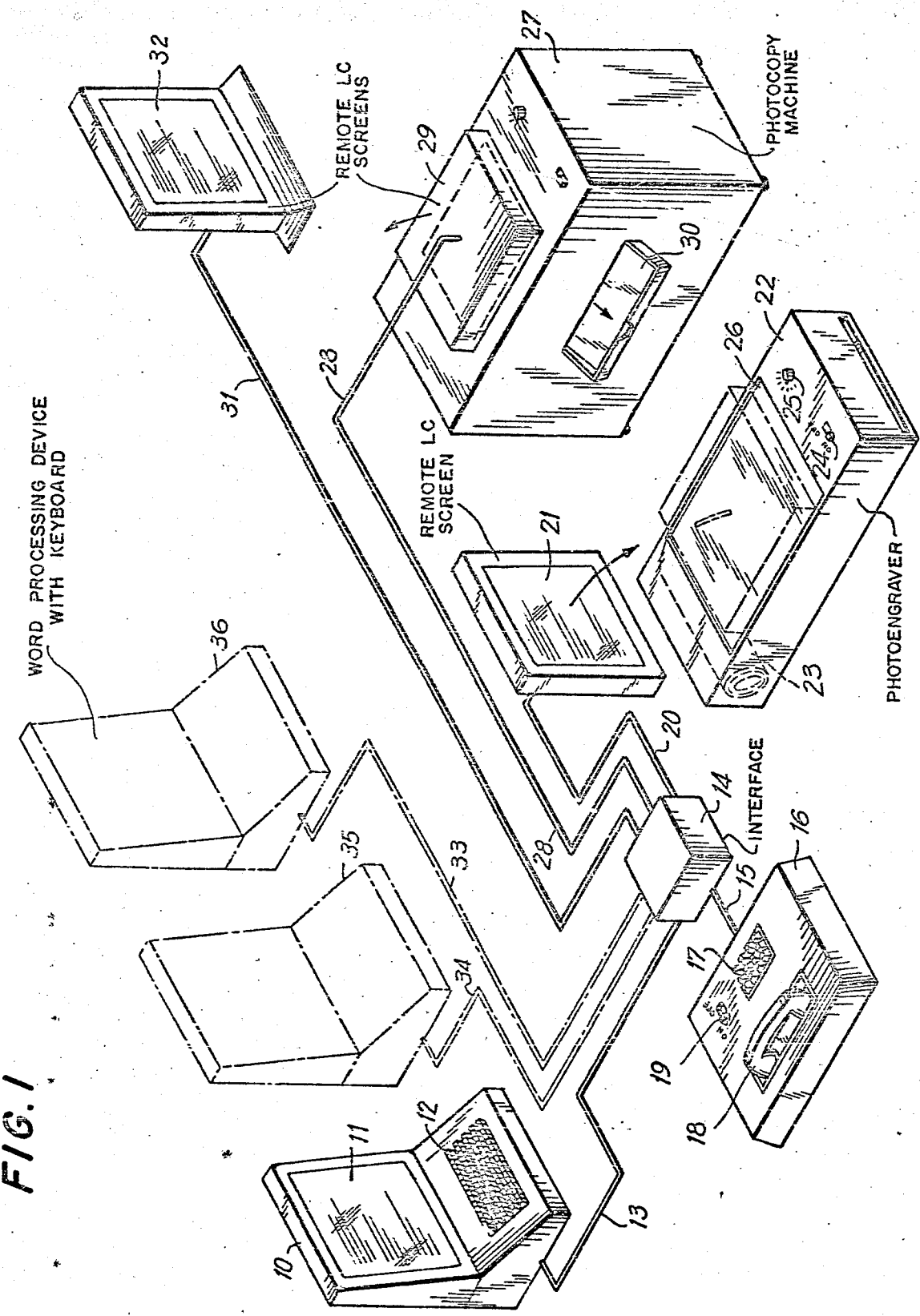
FIG. 1 is a perspective view showing one or more LC word processing stations interconnected to a plurality of display or copying devices according to the invention.

Referring to FIG. 1 there is shown a plurality of LCD word processing devices 10, 35 and 36 having LCD screens 11 and keyboards 12. The devices are connected via electrical lines 13, 34 and 33 to an interface circuit 14 which is capable of connecting them to a plurality of different outputs. One output is connected via line 15 to a facsimile transmitter and receiver 16 having an on-off switch 19 and a pushbuttom dialing system 17. There is also provided a cradle receptacle 18 so that a telephone can be used to transmit the information serially to a facsimile receiver at a remote location, or receive information from another station.

Another output of interface 14 comprises a LCD screen 21 connected via line 20, which can be placed on the glass screen 26 of a photographic or a photo engraving device 22. Control buttons 25 and 24 will operate the duplicator so that the indicia produced on screen 21 will be reproduced on photographic print paper 23.

Another output of interface 14 is connected via line 28 to an LCD screen 29 mounted on a conventional photocopy machine 27 which as a Xerox machine so that copies can be received from output 30. It is obvious that a plurality of copies of the same text can be made depending upon the setting of the photocopy machine.

A further output of interface 14 is connected via line 31 to a remote LCD screen 32 for observation.

Figure 2:
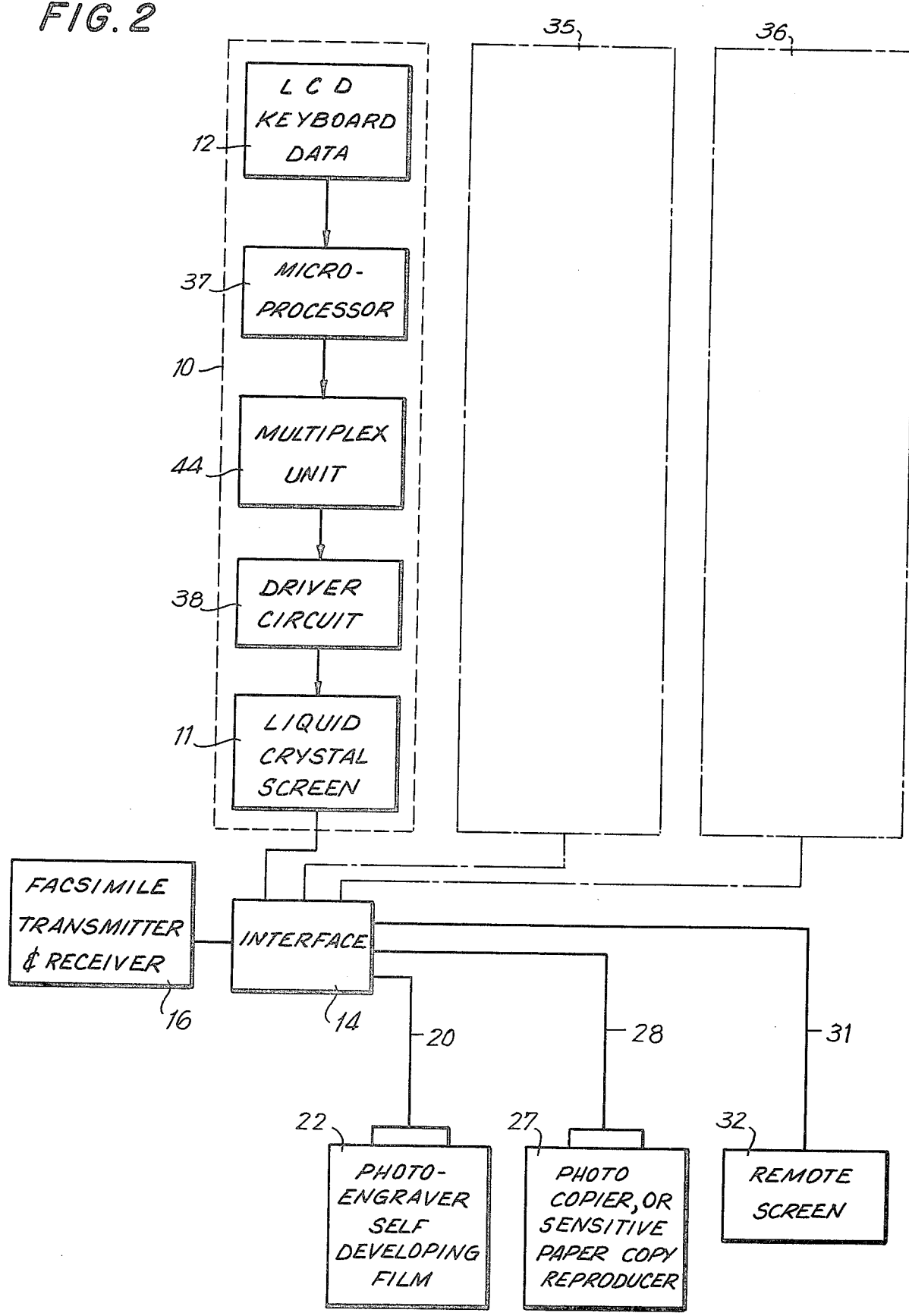
FIG. 2 is an electrical block diagram of the apparatus of FIG. 1.

Referring to FIG. 2 there is shown an electrical block diagram of the circuit of FIG. 1. In LCD processor 10, keyboard 12 feeds a microprocessor circuit 37 which has its output connected to a multiplex unit 44. The output of the multiplex unit is connected to a driver circuit 38 which is then connected to liquid crystal screen 11. The screen is also connected to interface circuit 14 which has its output connected to a facsimile transmitter and received 16, or the photoengraver or copiers 22 and 27 respectively, or remote screen 32.

In operation, when one of the indicia keys of keyboard 12 is depressed, microprocessor 37 scans the keyboard for the key depression. The microprocessor decodes the key to find out which key has been operated and then assesses its memory to generate the correct character on the display screen. The LC screen is turned on for a period of time and the other printing units 22, 27 and 32 can be attached to the same screen. Interface circuitry 14 takes care of the problem when two printing units 22 and 27 are activated by depressing keys simultaneously, the same fraction of a second, if that occurs.

There is also provided a "print" key on the keyboard. When the print key is depressed, the microprocessor will send the code to the logic circuitry on the image screen. This code interrogates to see if the image screen is in use. The image screen logic then sends a code to the processor about its status. If the screen is not in use, the microprocessor then sends a code to multiplex unit 44 to be ready to receive data. This process is called "hand shaking" and takes place where there is a status and ready communication between the processor and the interface circuitry. The "hand shaking" takes place in order to prevent interference if other terminal units such as 35 and 36 are tied to the same image screens. It is also possible to remove screen 11 from housing 11 with a trailing wire or a built-in power holding circuit to freeze the indicia on the LC screen so that the screen can be taken to a remote copier for printing.

Figure 3:
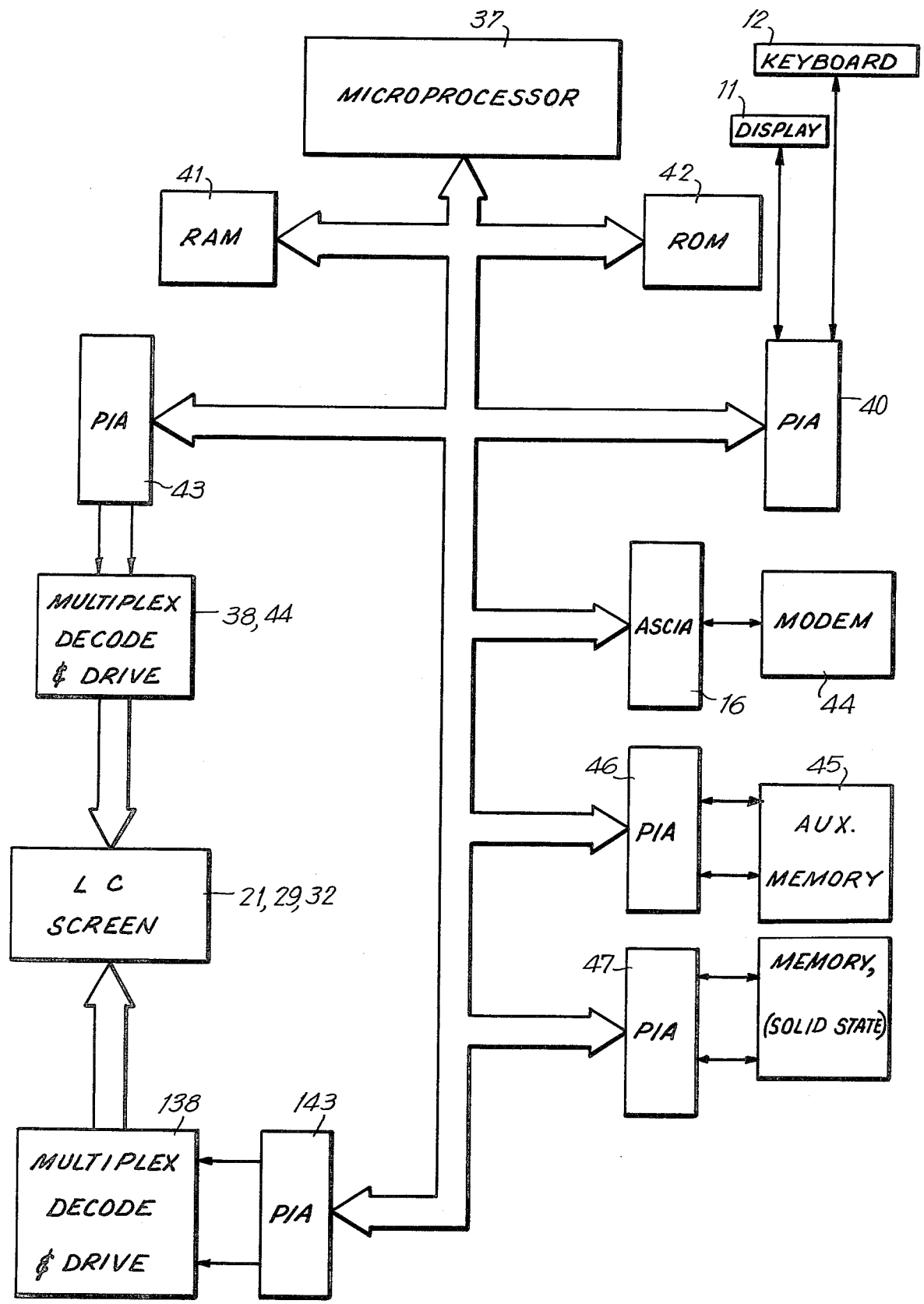
FIG. 3 is a further electrical block diagram in detail of a portion of the apparatus of FIG. 2.

FIG. 3 shows a more complex electrical diagram which also includes the memory storage units for the LCD word processor. Keyboard 12 in this case is connected to a peripheral interface adapter PIA 40 which controls the LCD display 11. PIA 40 is then connected through the main trunk of the circuitry to a microprocessor 37, a random access memory RAM 41 and a read-only memory ROM 42. Another pair of PIA circuits 46 and 47 are interconnected to solid state memory circuits 45 so that the keyboard information can be stored on memory devices such as PROMS, CCD's or MBMs.

The left side of the circuit in FIG. 3 shows connections to PIAs 43 and 143 which feed multiplex decode and drive circuits 38 and 138. PIAs 43 and 143 serve as the interface adapters from microprocessor 37 to the decode and drive circuitry 38. These terminate in LCD screens 21, 29 or 32 depending on the connection. The apparatus of FIG. 3, is set up to operate two overlapping LCD screens, each being driven by its separate decode or drive circuit 38 or 138. The screens have their indicia slightly offset with respect to each other so that the segmentation which is inherent in LCdisplays between individually activated areas can be eliminated. The ASCIA 16 is in the facsimile output as shown in FIGS. 1 and 2. This allows the information stored in the microprocessor to be fed out serially through a telephone line to a facsimile receiver or modem 44. It can also receive information from a remote source and display it for printing.

Random access memory device RAM 41 is a read-write memory wherein the binary digits within the memory can be changed as well as read by the microprocessor computer. RAMS are manufactured by Intel Corporation (2102) or National Semiconductor Corporation (MM2101-1 or MM2101-2). Read-only memory ROM 42 is a fixed semiconductor memory where it is not possible to change the state of the binary digits in the memory. The memory is put in when the ROM is manufactured so that it can be read but not changed. The ROM stores the codes for each keyboard indicia that is scanned by the microprocessor when a key is depressed.

Microprocessor unit 37 is an indefinite variety of logic devices implanted in an integrated circuit. This integrated circuit is composed of a chip of processed silicon wafer and is usually mounted in a dual inline package (DIP). The microprocessor can be considered a digital computer due to its similarity of instruction sets, addressing codes and execution speeds. Available microprocessor units are manufactured by Intel Corporation (8080) and National Semiconductor Corporation (SC/MP8080, and IMP/16). Peripheral interface adapters (PIAs) are also commercially available circuits for interconnecting peripheral device units and microprocessors.

Figure 4:
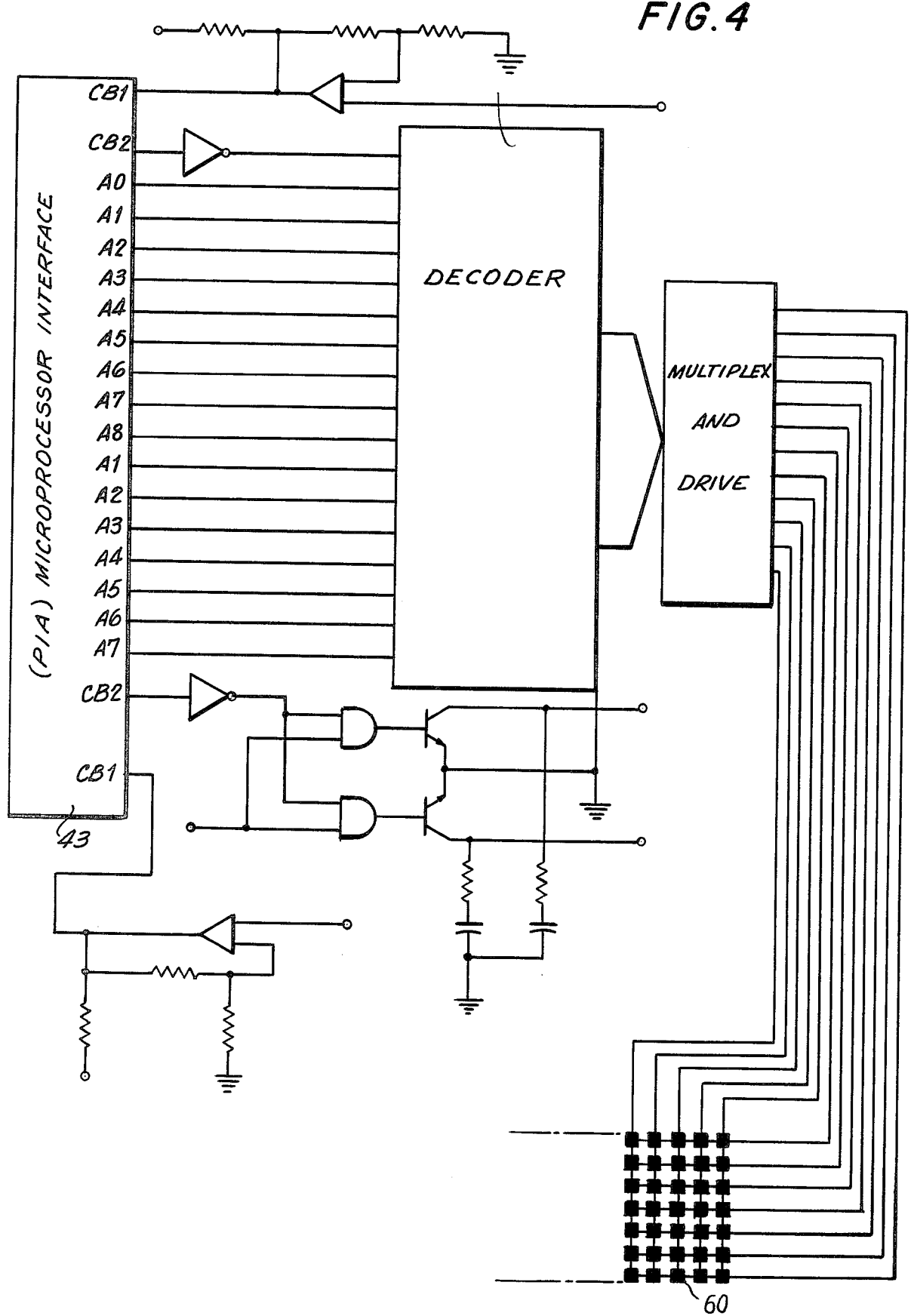
FIG. 4 is a schematic diagram of the driving circuit for a typical liquid display panel.

FIG. 4 is a combination of an electrical block diagram schematic diagram showing how a typical multisegmented liquid crystal display 60 is driven.

The multiplexing of a liquid crystal is performed in many ways. A drive voltage of 6 volts can be provided to drive the liquid crystal to produce an opaque area on the screen. There are a number of different ways to multiplex the segment displays or dots. One of the preferred ways is by placing the decoded circuitry on the screen itself. There are other technologies that can be used such as PLTZ and electronic displays. All displays such as LCD must be constantly refreshed in order to retain the image. The memory time is 200 milliseconds on some of the crystals, but can vary. There are various ways in multiplexing a PLTZ crystal on the electrode of a conductive photoresit glass, which usually used the "NESA" glass made by Pittsburgh Plate Glass. It is a conductive glass and it has a photoresist pattern on it that is etched by photoresistant process.

The crystal can be excited by putting the voltage on it. The driving voltage for liquid crystal at this present time is about 6 volts. When the crystal is strobed, the individual arrays are connected to ground, either in the XY pattern, or in a strobing technique, one line at a time. The decoder chip is placed on the screen itself and information is sent serially to the decoded chip so that this decoded chip will access the individual dots. This more efficient way has less connections to the glass.

In FIG. 4, the decoded information comes straight from the microprocessor and the decoded information can be multiplexed by a decoder and driver chip. The processor contains input lines A0, A1, A2, A3, A4, A5, etc. depending on how many dots that are being driven. Terminal CB2 is connected to a drive circuit for turning on the copy machine. The microprocessor will have direct control over the turning "on" and "off" of the copy machine and controlling for example, the stepper, paper movement, etc. The heart of the control is the microprocessor. The preferred circuit includes the decoding and drive circuitry on the screen itself. This minimizes the amount of wires connected to screen 60.

FIG. 5 is a cross-sectional view through a typical liquid crystal display of the present invention showing a housing 50 having three LC display panels 52, 53 and 54 which are covered by a photosensitive paper sheet 55. Each of the LC displays 52, 53 and 54 are driven by separate multiplex and driver circuits so that the identical indicia or alphanumeric information is displayed on each one. However, the LC displays are offset with respect to each other by a small amount and in one of three or four directions, so that the space between the LC segments can be masked over and an uninterrupted continuous indicia can be produced.

FIG. 6 illustrates a typical 15 segment display for either an X-shaped figure or a rounded figure showing the segments involved. FIG. 7 shows an alignment of four LC units 58 which are superimposed over one another so that the segmentation can be eliminated. FIG. 8 shows different ways of making up the number 2 so that when the two indicia 59 overlap each other, there is no showing of any segmentation.

FIG. 9 shows one LC strip which is used for making a line of indicia through multiplexing, and is composed of a plurality of small closely spaced dot matrix.

FIG. 10 is a detailed view of a completely closed LCD display section formed by the dot matrix of FIGS. 11, 12, 13 and 14 superimposed. The dots of one layer overlap the dots of succeeding layers to form a solid letter from an open matrix.

The resolution on the liquid crystal display can be 20 thousandths of an inch square and so that extra plates may not be needed.

In the present invention, it has been found that if the segmentation is not objectionable, only a single LCD screen is required since it has been found that the resolution of most photocopy processors such as a Xerox processor will not be able to pick up the spaces between the LC segments. This is because the black reproduction will slightly blur across the gap between the segments to form perfect letters and numbers.

Where fine detail is required, two, three or four overlapping screens may be desirable to eliminate the spaces between the LC segments. With a total of four screens overlapping, it is possible to completely eliminate spacing between the LC segments when a high contrast print is made from a photocopy machine.

As a word processing apparatus, the user will type a complete page of written text using keyboard 12 so that it will appear on LCD display 11 on the console. At the same time, the memory circuit which may consist of a solid state memory 45, will also record the information on the page. Suitable corrections can be made on the display indicia and then the operator can press a "print" button which will cause the display to appear on the remote LC screen or screens 21 or 29 almost instantaneously and a photocopy picture can be taken of the LC display. Since there is no mechanical printer involved in forming the letters, the information stored on the solid state memory can be rapidly read onto the LC display and quickly printed.

Another advantage of the present invention is that the size and style of type can be changed. For example, if a short business letter is to be reproduced on a company letterhead using a photocopy process, the lettering can be increased in size and adjusted to the margins. In ROM 42 can be stored binary information relating to Gothic type style, Roman type style as well as type size information so that the depressing of a particular key bearing the type style on the keyboard will automatically change the readout display to that type style.

The memory circuit 45 will also allow one to store a large number of pages of written information such as a multipage report so that it can be recalled at any time and rapidly reprinted sequentially.

It is also possible for the operator to make multiple copies of each page in the memory and collate them on the copying machine by depressing the appropriate keyboard button.

While only a few embodiments of the present invention have been shown and described, it will be obvious to those skilled in the art that many changes and modifications may be made thereunto without departing from the spirit and scope of the invention.

What is claimed is:

1. A word processing system for displaying and reproducing alphanumeric characters comprising:
   a housing including an electronic keyboard with keys representing individual alphanumeric characters;
   at least one solid state reflective display for logic means connected to said keyboard and solid state reflective display for scanning said keyboard upon the depression of one or more keys;

solid state memory means having stored coded character information and coupled to said logic means for sequencing said logic means for each of the keyed characters depressed and for generating a displayed character on said solid state display screen responsive to the character keyed; and print means coupled to said solid state display for reprinting the characters appearing on said display.

2. The word processing system as recited in claim 1 wherein said at least one solid state display comprises a liquid crystal display.

3. The word processing system as recited in claim 2 additionally comprising recorded memory means coupled to said logic means for sequentially storing the coded character information produced by said keyboard.

4. The word processing system as recited in claim 3 wherein said liquid crystal display comprises at least one liquid crystal screen, a multiplex decoder and driver circuit having its output coupled to said screen and its input coupled to said logic means for sequentially displaying the alphanumeric characters on the screen.

5. The word processing system as recited in claim 4 wherein said print means comprises a photocopy machine.

6. The word processing system as recited in claim 5 wherein said at least one liquid crystal display is coupled to said housing adjacent said electronic keyboard and compromising a second liquid crystal display coupled to said at least one liquid crystal display and in optical contact with said photocopy machine.

7. The word processing system as recited in claim 6 wherein said liquid crystal displays comprise at least two liquid crystal screens superimposed with respect to each other wherein said screens have an identical dot matrix layout with respect to each other, wherein one of said dot matrix layouts is slightly offset with respect to the other in an amount sufficient to fill in the space between the matrix dots.

8. The word processing system as recited in claim 1 wherein said logic means comprises a microprocessor and said solid state memory means comprises a ROM.

9. The word processing system as recited in claim 3 wherein said recorded memory means comprises a ROM.

10. The word processing system as recited in claim 2 wherein said at least one liquid crystal display comprises four display screens superimposed with respect to each other and disposed in close adjacent proximity, said screens having identical dot matrix layout wherein each of the dot matrix layouts of adjacent screens are offset in one of four directions in an amount sufficient to fill in the space of adjacent dot matrix segments so that a character generated simultaneously on all four screens will be continuous without segmentation.

11. The word processing system as recited in claim 2 wherein said at least one solid state display comprises an electrochromex screen.

12. The word processing system as recited in claim 2 wherein said at least one solid state display comprises a PLTZ screen.

13. The word processing system as recited in claim 1 wherein said print means comprises a photoengraver having self-developing film.

14. The word processing system as recited in claim 3 wherein said print means comprises a photocopy machine.

15. The word processing system as recited in claim 1 additionally comprising a facsimile transmitter and receiver coupled to said logic means for sequentially transmitting and receiving alphanumeric character information to and from a remote source for display on said solid state display.

16. The word processing system as recited in claim 2 wherein said at least one liquid crystal display comprises a remote liquid crystal screen for displaying generated character information at a remote location.

17. The word processing system as recited in claim 14 wherein said keyboard additionally comprises print key means coupled to said photocopy machine for sequentially reproducing the alphanumeric characters reproduced on said liquid crystal display.

18. The word processing system as recited in claim 17 wherein said print key means is coupled to said recorded memory means, for reproducing a series of pages of stored information on said photocopy machine in response to said print key.

* * * * *

UNITED STATES PATENT OFFICE
CERTIFICATE OF CORRECTION

Patent No. 4,110,794  Dated August 29, 1978

Inventor(s) Robert W. Lester

It is certified that error appears in the above-identified patent and that said Letters Patent are hereby corrected as shown below:

Column 3, line 18, after "plurality" insert --of--; Col. 3, line 57, delete "received" and substitute therefor --receiver--. Column 5, line 18, delete "electronic" and substitute therefor --electrochromic or electrochromex--; Col. 5, line 23, delete "used" and substitute therefor --uses--. Column 6, line 68, after "for" insert --reproducing the characters identified on the keyboard; --. Column 7, line 33, delete "compromising" and substitute therefor --comprises--. Column 8, lines 14 and 17, delete "2" and substitute therefor --1--.

Signed and Sealed this

Nineteenth Day of June 1979

[SEAL]

Attest:

RUTH C. MASON
Attesting Officer

DONALD W. BANNER
Commissioner of Patents and Trademarks